US008112897B2

(12) United States Patent
Valoff et al.

(10) Patent No.: US 8,112,897 B2
(45) Date of Patent: Feb. 14, 2012

(54) MONITORING DEVICES, ASSEMBLIES AND METHODS FOR ATTACHMENT TO GAUGES AND THE LIKE

(75) Inventors: Scott Valoff, San Diego, CA (US); Marcus Kramer, San Diego, CA (US); Eric Gawehn, Mountain View, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 594 days.

(21) Appl. No.: 12/321,452

(22) Filed: Jan. 21, 2009

(65) Prior Publication Data
US 2009/0183584 A1 Jul. 23, 2009

Related U.S. Application Data

(63) Continuation-in-part of application No. 12/283,701, filed on Sep. 12, 2008, and a continuation-in-part of application No. 12/214,171, filed on Jun. 16, 2008.

(60) Provisional application No. 61/022,230, filed on Jan. 18, 2008, provisional application No. 61/033,694, filed on Mar. 4, 2008.

(51) Int. Cl.
*G06K 9/00* (2006.01)
*G01D 11/00* (2006.01)
*G12B 9/00* (2006.01)
*G06F 11/00* (2006.01)

(52) U.S. Cl. ............ 33/505; 382/100; 340/870.02; 116/304; 73/866.3; 248/27.1

(58) Field of Classification Search ............ 33/505; 116/304, 305; 73/431, 866.3; 248/27.1
See application file for complete search history.

(56) References Cited

U.S. PATENT DOCUMENTS

| | | | |
|---|---|---|---|
| 4,310,133 A | 1/1982 | Wetterhorn et al. | |
| 4,410,155 A | 10/1983 | Wetterhorn et al. | |
| 4,680,704 A | 7/1987 | Konicek et al. | |
| 4,948,074 A | 8/1990 | Bramhall, Jr. | |
| 5,672,823 A | 9/1997 | Lachmann et al. | |
| 5,673,331 A | 9/1997 | Lewis et al. | |
| 6,053,043 A | 4/2000 | Dannenberg et al. | |
| 6,085,597 A | 7/2000 | Miller et al. | |
| 6,098,029 A | 8/2000 | Takagi et al. | |
| 6,244,107 B1 | 6/2001 | Nelson et al. | |
| 6,282,969 B1 | 9/2001 | Daniel | |
| 6,326,896 B1 | 12/2001 | McDermott et al. | |
| 6,701,789 B1 | 3/2004 | Denny | |
| 6,820,486 B2 | 11/2004 | Okitsu | |
| 6,845,177 B2 | 1/2005 | Chiu | |
| 6,853,309 B1 * | 2/2005 | Schroter | 340/870.02 |
| 6,891,838 B1 | 5/2005 | Petite et al. | |
| 6,938,859 B2 | 9/2005 | Beausoleil | |
| 7,064,678 B2 | 6/2006 | Kim et al. | |
| 7,242,806 B2 | 7/2007 | Johnson et al. | |
| 7,551,783 B2 | 6/2009 | Johnson et al. | |
| 7,650,210 B2 | 1/2010 | Breed | |

(Continued)

OTHER PUBLICATIONS

International Search Report for International Application No. PCT/US09/00391 mailed Jan. 15, 2010; 2 pages.

(Continued)

*Primary Examiner* — Amy Cohen Johnson

(57) ABSTRACT

A monitoring device assembly and method may include a primary interface for attaching to a monitored device, and a monitoring device mechanically coupled to the primary interface that captures an image of the monitored device.

20 Claims, 13 Drawing Sheets

U.S. PATENT DOCUMENTS

| | | | |
|---|---|---|---|
| 8,009,020 B2 * | 8/2011 | Riedel et al. | 340/286.05 |
| 2004/0045380 A1 | 3/2004 | Nelson et al. | |
| 2006/0178193 A1 | 8/2006 | Hunter | |
| 2006/0212407 A1 | 9/2006 | Lyon | |
| 2008/0148877 A1 | 6/2008 | Sim | |
| 2009/0073307 A1 * | 3/2009 | Kramer et al. | 348/370 |
| 2009/0190795 A1 * | 7/2009 | Derkalousdian et al. | 382/100 |

OTHER PUBLICATIONS

The Written Opinion of the International Searching Authority for International Application No. PCT/US09/00391 mailed Jan. 15, 2010; 3 pages.

Ferret.com.au, "Remote Steam Boiler Water Level Gauge," [online Jan. 17, 2003, retrieved on Mar. 23, 2010], retrieved from the internet <http://www.ferret.com/au/n/Remote-steam-boiler-water-level-gauge-n722919>; 1 page.

U.S. Appl. No. 11/644,332: "Gauge Reading Device and System," Harry Sim, filed on Dec. 21, 2006; 58 pages.

International Search Report of the International Searching Authority, dated Jun. 2, 2008 for International Application No. PCT/US2007/026186; 4 pages.

Written Opinion of the International Searching Authority, dated Jun. 2, 2008 for International Application No. PCT/US2007/026186; 7 pages.

U.S. Appl. No. 12/214,171: "Sense/Control Devices, Configuration Tools and Methods for Such Devices, and Systems Including Such Devices," Sim et al., filed on Jun. 16, 2008; 90 pages.

International Search Report of the International Searching Authority, dated Oct. 1, 2008 for International Application No. PCT/US2008/007607; 5 pages.

Written Opinion of the International Searching Authority, dated Oct. 1, 2008 for International Application No. PCT/US2008/007607; 4 pages.

U.S. Appl. No. 12/283,701: "Digital Image Capture Device and Method," Kramer et al., filed Sep. 12, 2008; 55 pages.

U.S. Appl. No. 12/322,200: "Gauge Monitoring Methods, Devices and Systems," Derkalousdian et al., filed Jan. 30, 2009; 63 pages.

International Search Report of the International Searching Authority, dated Mar. 17, 2009 for International Application No. PCT/US2009/000643; 2 pages.

Written Opinion of the International Searching Authority, dated Mar. 17, 2009 for International Application No. PCT/US2009/000643; 5 pages.

"Item Details: Grainger 1X815 Pressure Transmitter," Internet at <http://www.grainger.com>; 1 page.

Kenn Sebesta, "A-D Converter the Hard (But Cheap!) Way," Internet at <http://www.eissq.com/DialADC.html#Matlabcode>, 2008; 11 pages.

* cited by examiner

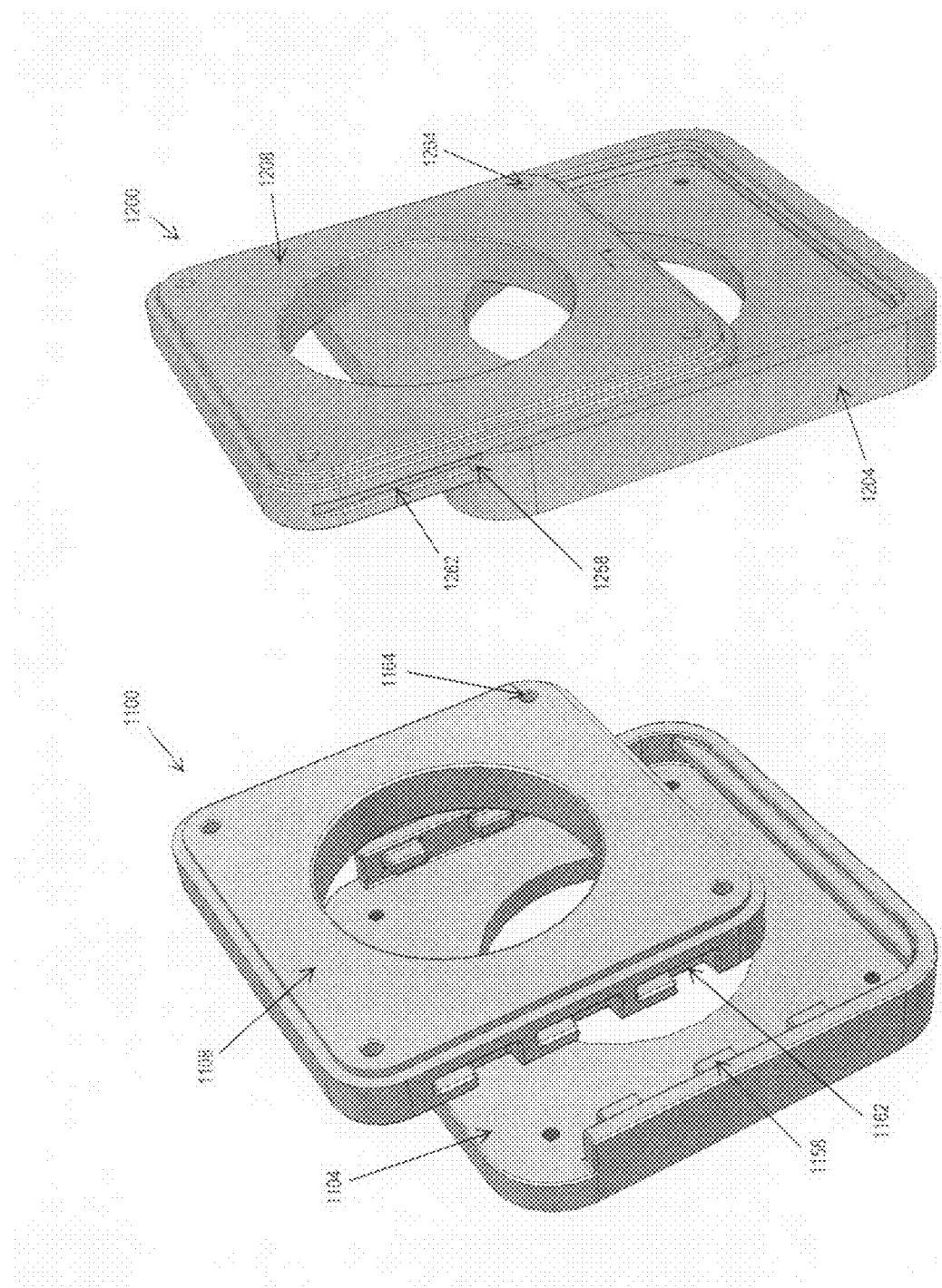

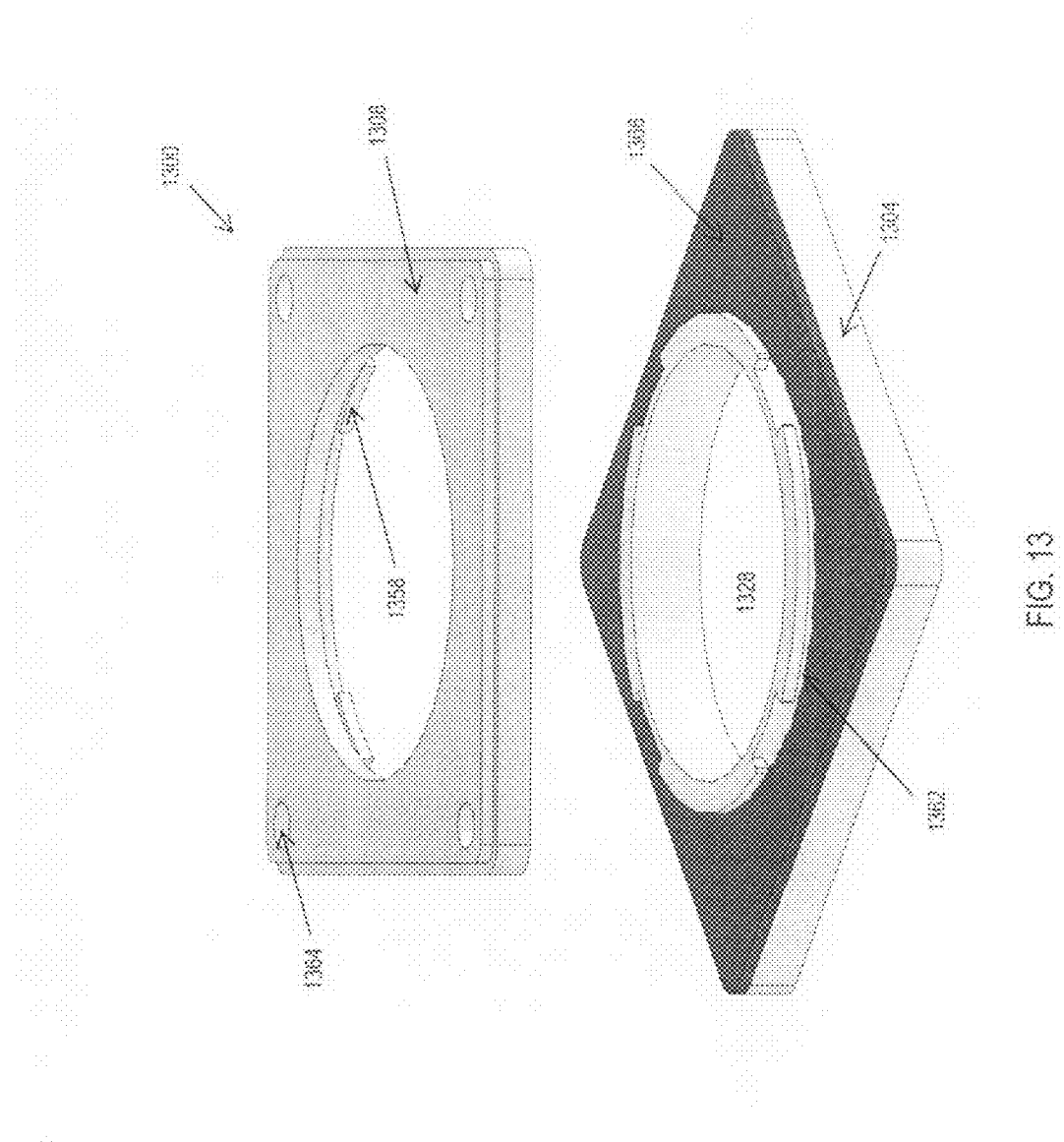

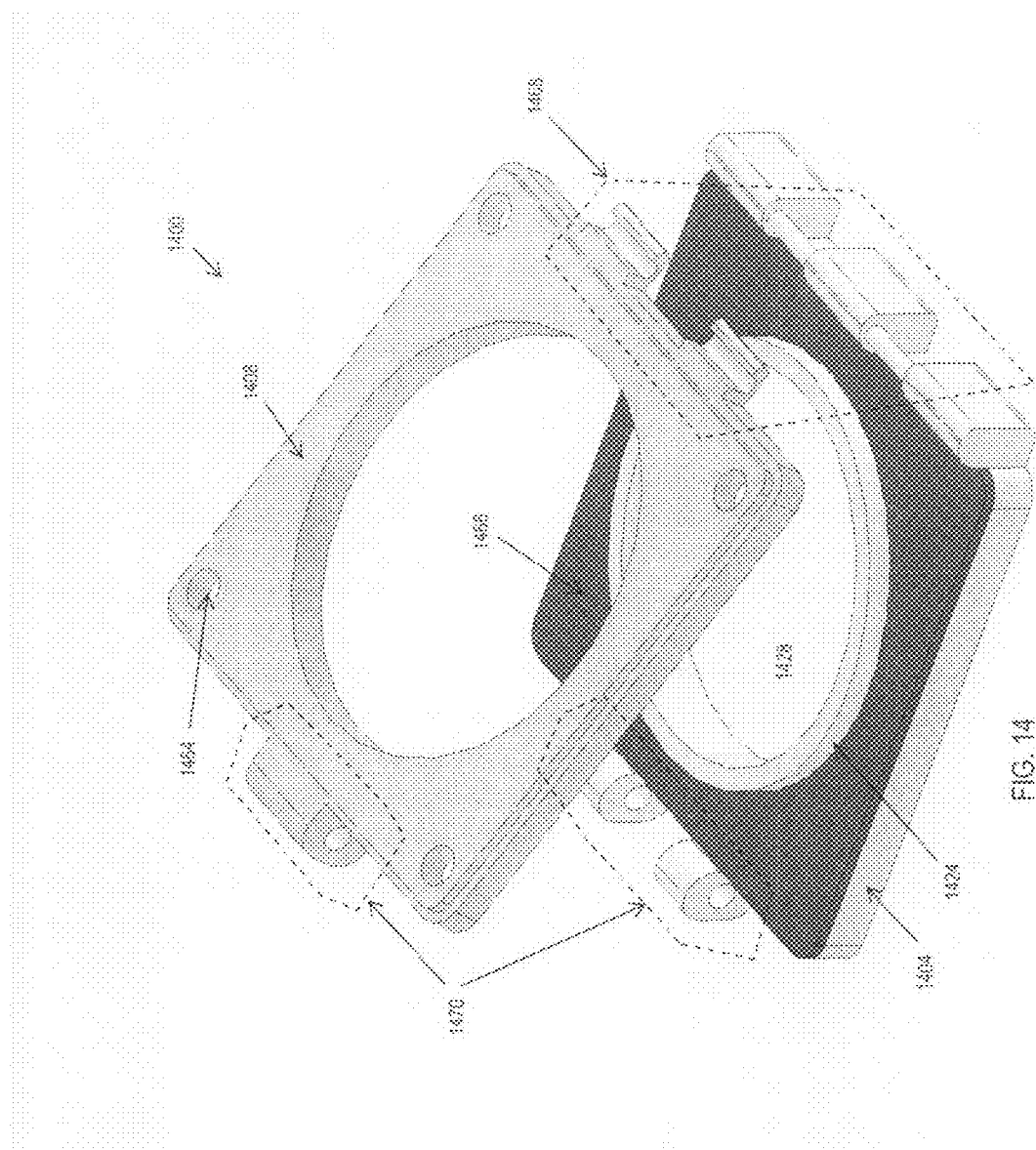

MONITORING DEVICES, ASSEMBLIES AND METHODS FOR ATTACHMENT TO GAUGES AND THE LIKE

RELATED APPLICATIONS

This application claims the benefit of U.S. provisional patent applications having Ser. No. 61/022,230 filed on Jan. 18, 2008, and 61/033,694 filed on Mar. 4, 2008, the contents of both of which are incorporated by reference herein. This application is also a continuation-in-part of U.S. patent application Ser. No. 12/214,171 filed on Jun. 16, 2008 and a continuation-in-part of U.S. patent application Ser. No. 12/283,701 filed on Sep. 12, 2008. The contents of these applications are also incorporated by reference herein.

TECHNICAL FIELD

The present disclosure relates generally to devices and systems for monitoring or controlling equipment, and more particularly to devices and methods for attaching a monitoring device to a monitored piece of equipment, such as a gauge or the like.

BACKGROUND

Many existing industrial sites were constructed with equipment having no capability of being automatically monitored or controlled. As a result, manpower can be required to periodically, or constantly, survey the equipment of the site. This can be time consuming and/or costly.

Still other sites may operate with outdated analog monitoring and control systems requiring wiring of control signals throughout the site (e.g., 0-5 volt, 0-10 volts, 0-15 volt, 4-20 mA DC type control systems). Such approaches can require constant maintenance of wiring and wiring conduits which can also be time consuming and costly.

BRIEF DESCRIPTION OF THE DRAWINGS

FIG. 11 is an exploded view of an assembly according to another embodiment.

FIG. 12 is an exploded view of an assembly according to another embodiment.

FIG. 13 is an exploded view of an assembly according to another embodiment.

FIG. 14 is an exploded view of an assembly according to another embodiment.

DETAILED DESCRIPTION

Figure 1:
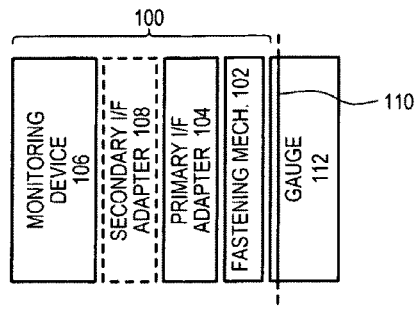
FIG. 1 is a block diagram showing an assembly according to one embodiment.

Various embodiments will now be described in detail that show devices and methods for attaching a monitoring device to a monitored piece of equipment (such as a gauge or the like). In some embodiments, such devices and methods may enable a monitoring device to be rapidly and/or easily disconnected from a monitored piece of equipment. Upon such removal, the monitored equipment may still be visible for inspection and/or cleaning. Further, such rapid/easy removal may enable the monitoring device to be serviced and/or replaced without disturbing corresponding equipment that is being monitored.

In the various embodiments shown below, similar items are referred to by the same reference character but with the first digit(s) corresponding to the figure number.

Referring now to FIG. 1, a monitoring assembly according to a first embodiment is shown in a block diagram and designated by the general reference character 100. Assembly 100 may include a fastening mechanism 102, a primary interface (i/f) adapter 104, and a monitoring device 106. Optionally, an assembly 100 may include a secondary i/f adapter 108 disposed between primary i/f adapter 104 and monitoring device 106.

An assembly 100 may be attachable to a surface associated with a monitored piece of equipment. More particularly, an assembly 100 may enable monitoring device 106 to capture an image of a monitored device through primary i/f adapter 102 (and secondary i/f adapter, if present), and convert such an image into a digital reading. In an embodiment, the fastening mechanism 102 may substantially center monitoring device 106 with respect to a gauge 112. Monitoring device 106 may calibrate itself. In the very particular embodiment of FIG. 1, an assembly may be attachable to a "gauge surface" 110 associated with a gauge 112. It is understood that a gauge surface 110 is not necessarily a portion of a monitored gauge, and may include, as will be described in more detail below, a surface of a structure, such as a panel, that contains the gauge being monitored. A gauge surface may be parallel to a display face of a monitored gauge.

A fastening mechanism 102 may physically attach an assembly 100 to a gauge surface 110, through any of various ways, particular examples of which will be described below.

A primary i/f adapter 104 may be attached at one end to a gauge surface by fastening mechanism 102. In particular embodiments, a fastening mechanism 102 may be separate from a primary i/f adapter 104. In other embodiments, a fastening mechanism 102 may be integral to a same structure as primary i/f adapter 104. In still other embodiments, a fastening mechanism 102 may have one portion separate from a primary i/f adapter 104 structure, and another portion integral with such a structure.

A primary i/f adapter 104 may also be mechanically coupled to a monitoring device 106, to enable such a monitoring device 106 to be physically positioned to monitor a corresponding piece of equipment (e.g., gauge). A primary i/f adapter 104 may be directly connected to a monitoring device 106, or optionally connected via an intervening structure, such as a secondary i/f adapter 108.

An optional secondary i/f adapter 108 may provide a mechanical connection between primary i/f adapter 102 and monitoring device 106.

A monitoring device 106 may acquire an image of the monitored equipment (in this embodiment a gauge 112). In very particular embodiments, a monitoring device may be a wireless gauge reader that captures an image of an analog gauge, converts the image into a digital reading value, and then transmits such a value to a location remote from the gauge.

It is understood that in particular embodiments, a monitoring device 106 may be moved to expose equipment being monitored (e.g., gauge 112). In very particular embodiments, such movement may occur at an interface between primary i/f adapter 104 and monitoring device 106 (or between primary i/f adapter 104 and secondary i/f adapter 108), leaving a primary i/f adapter 102 physically attached to a gauge surface 110 by fastening mechanism 102. In such an arrangement, a secondary i/f adapter 106, if present, may remain physically attached to monitoring device 106. As will be shown by exemplary embodiments below, movement of a monitoring device 106 may include separation of the device from assembly, or alternatively, monitoring device 106 may remain attached to the assembly (e.g., by hinges, or the like).

In this way, an assembly may include a primary i/f adapter that may be connected to a monitored surface with a fastening mechanism, and that may also provide a physical connection, directly or indirectly, for positioning a monitoring device to monitor one or more pieces of equipment.

Figures 2A, 2B:
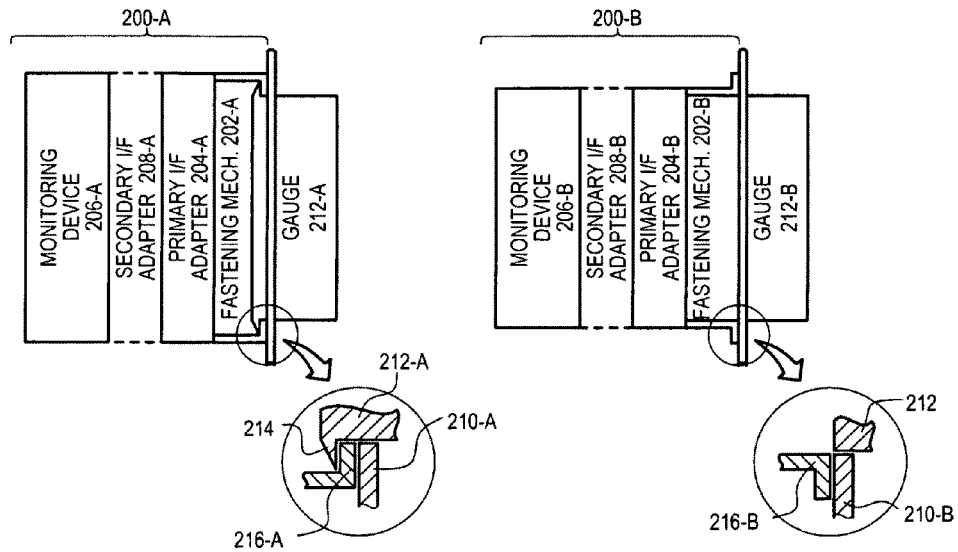
FIGS. 2A to 2C are block diagrams of systems according to other embodiments.
Figure 2C:
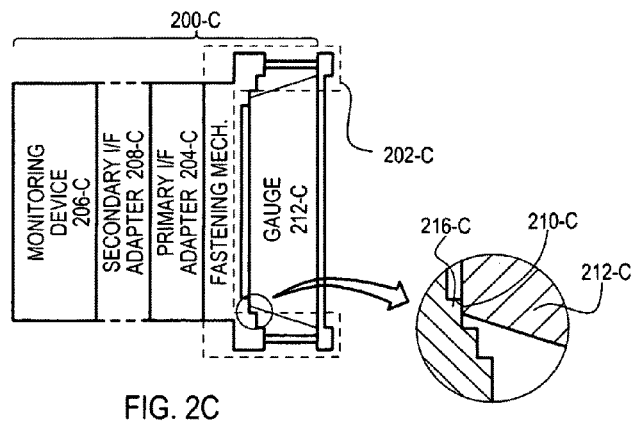

Referring now to FIGS. 2A to 2C, various other embodiments will now be described. The embodiments of FIGS. 2A-2C may, in some variations, be particular examples of that shown in FIG. 1.

Referring to FIG. 2A, an assembly 200-A for attachment to a flanged, panel-mounted gauge is shown in a block diagram. That is, a gauge 212-A may extend above a surface 210-A of a panel in which the gauge 212-A is installed. Further, a gauge 212-A may include a gauge flange 214 projecting outward from a gauge face region. A gauge flange 214 may include other features such as ribs, spars, lips, or rims that extend outward over surface containing the gauge.

In the embodiment shown in FIG. 2A, a fastening mechanism 202-A may include an attachment portion 216-A that may be positioned between a gauge flange 214 and gauge surface 210-A.

In this way, an assembly may have a physical connection by portions that extend between projections of a gauge, and the gauge surface in which the gauge may be mounted.

Referring to FIG. 2B, an assembly 200-B that may be directly attached to a panel surface is shown in a block diagram. Such an embodiment may be utilized in cases where a gauge 212-B is flush with, or recessed within, a surface 210-B of a panel, and does not include a feature such as a gauge flange.

In the embodiment shown, a fastening mechanism 202-B may include an attachment portion 216-B that is directly connected to gauge surface 210-B.

In this way, an assembly may have a physical connection directly to the surface in which a gauge is mounted.

Referring to FIG. 2C, an assembly 200-C for direct attachment to a gauge having angled surfaces is shown in a block diagram. In particular, surfaces of gauge 212-C not parallel to a gauge face may be angled.

In the embodiment shown, a fastening mechanism 202-C may include an attachment portion 216-C that directly contacts a gauge surface 210-C, which in the embodiment shown, may be a gauge face. A fastening mechanism 202-C may force a gauge surface 210-C into a primary i/f adapter 204-C. Such an embodiment may be utilized in cases where an angled surface may make it difficult to attach to side surfaces of a gauge. In particular embodiments, a fastening mechanism 202-C may have a stepped series of surfaces for contacting a gauge face. Such steps may help to center a view axis of a monitoring device 206-C with respect to a center of a gauge 212-C.

In this way, an assembly may be made with equipment having sloped surfaces with respect to a surface being monitored.

Figure 3:
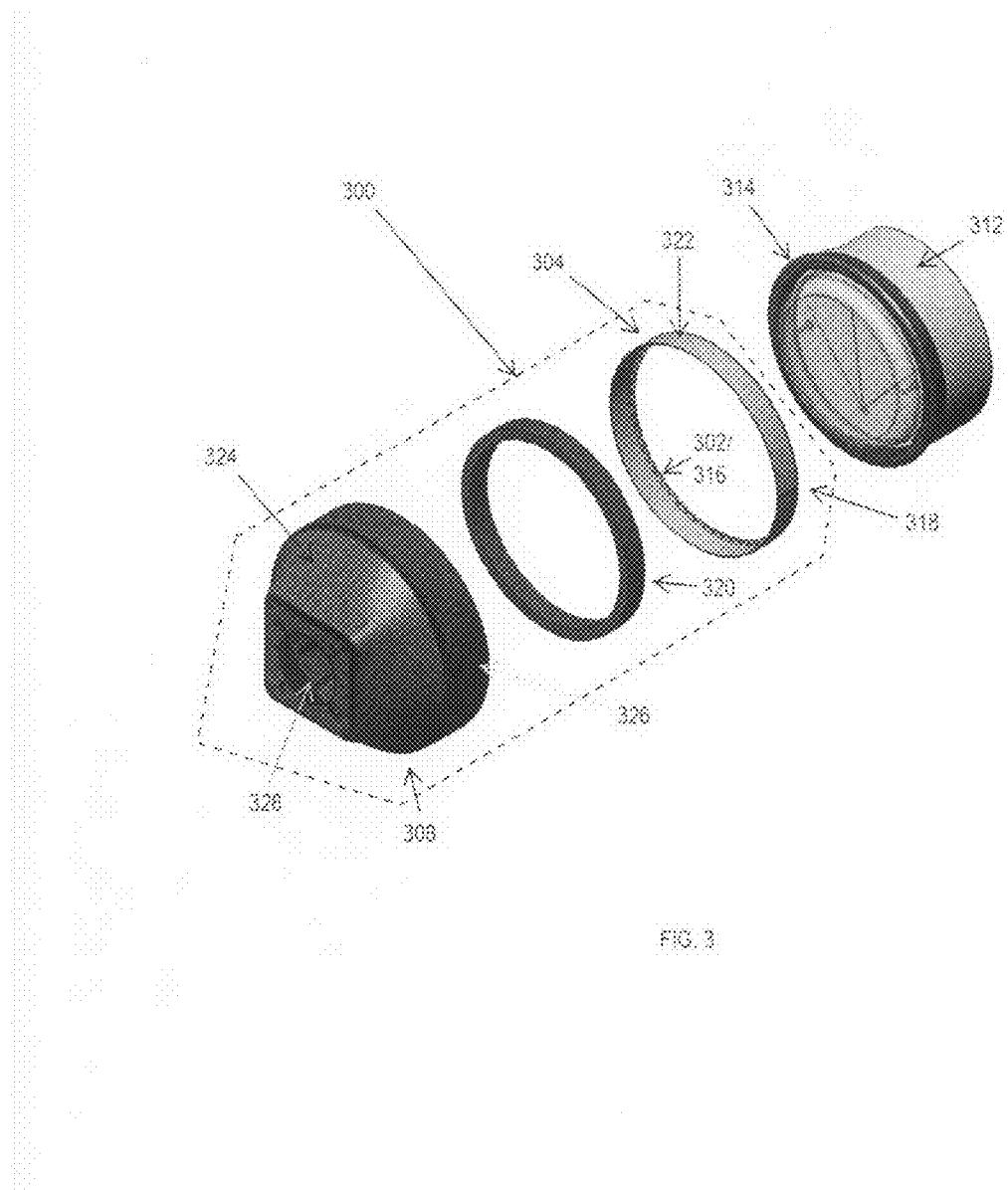
FIG. 3 is an exploded view showing one embodiment.

Referring now to FIG. 3, an assembly 300 according to another embodiment is shown in an exploded view. In one particular arrangement, the embodiment of FIG. 3 may be one variation of that shown in FIG. 2A.

In the specific embodiment of FIG. 3, a fastening mechanism 302 may be integral With primary i/f adapter 304. In particular, a primary i/f adapter 304 may have an expandable and/or trimmable open-ring shape, which may surround an outer edge of a gauge 312. A fastening mechanism 302 may include multiple capture fingers (one shown as 316) serving as attachment portions. Such capture fingers may be inserted between a gauge flange 314 and a surface in which the gauge may be installed (not shown in FIG. 3). Once capture fingers are inserted in such a fashion, a surrounding ring portion 322 may extend away from a monitored gauge face, to provide an adapter attachment surface. It is noted that primary i/f adapter 306 may be trimmable to accommodate smaller diameter gauges. Further, primary i/f adapter 306 may also include a fitting gap 318 that may enable the structure to expand to accommodate larger diameter gauges, and also enables the structure to be installed without having to disconnect wiring from a gauge 312. Further, such a primary i/f adapter 306 may maintain a monitoring device (not shown) centered with respect to a gauge 312, even when such gauge diameters vary in size.

Assembly 300 of FIG. 3 may also include a secondary i/f adapter 308. The particular secondary i/f adapter 308 of FIG. 3 may have a shell structure with a surrounding side surface 324, compressible edge 326, and an opening 328. A side containing opening 328 may include mechanical features for attaching a monitoring device such that an image of gauge 312 may be acquired through opening 328. As but one example, a secondary i/f adapter 308 may include holes for receiving attaching structures, such as screws, bolts, or rivets that may fix a monitoring device (not shown) to a secondary i/f adapter 308. A compressible edge 326 may include a number of fingers covered by a surrounding band. Compressible edge 326 may fit over surrounding ring portion 322 of primary i/f adapter 304. A hose clamp (not shown) or similar device may tighten compressible edge 326 to create a friction attachment with primary if/adapter 304.

In particular embodiments, a guiding feature (such as a groove or marking) may ensure a predetermined rotational alignment between a primary i/f adapter 304 and second i/f adapter 308. Consequently, when such adapters are re-connected, they may maintain a predetermined rotational alignment. This may enable a monitoring device to avoid re-initializing an image capture set-up or calibration routine after having been disconnected from the assembly.

The embodiment of FIG. 3 may further include a compression ring 320. A compression ring 320 may prevent primary i/f adapter 302 from being deformed when second i/f adapter 308 is attached to it with a compression fitting (i.e., a fitting that compresses primary i/f adapter 302 from an outer surface).

It is noted that an attachment between primary i/f adapter 304 and secondary i/f adapter 308 may provide a quicker release than a connection between a monitoring device (not shown) and secondary i/f adapter 308. Accordingly, according embodiments, after being attached to monitor a particular gauge 312, an assembly 300 may be opened by removing second i/f adapter 308 (with the monitoring device still attached thereto) while primary i/f adapter 304 remains installed on a gauge surface. Very particular embodiments having a quick disconnect type arrangement are shown in other embodiments below (e.g., FIGS. 10, 11, 12, 13 and 14). This may enable gauge 312 to be inspected or cleaned. If a guiding feature is included, a secondary i/f adapter 308 (with monitoring device attached) may then be re-attached to the assembly, maintaining a previous rotational alignment with a gauge. This may allow monitoring operations to continue without having to recalibrate the monitoring device.

In this way, an assembly may include an expandable and/or trimmable ring structure with capture fingers for insertion between a gauge flange and panel surface in which the gauge may be mounted.

Figures 4A, 4B:
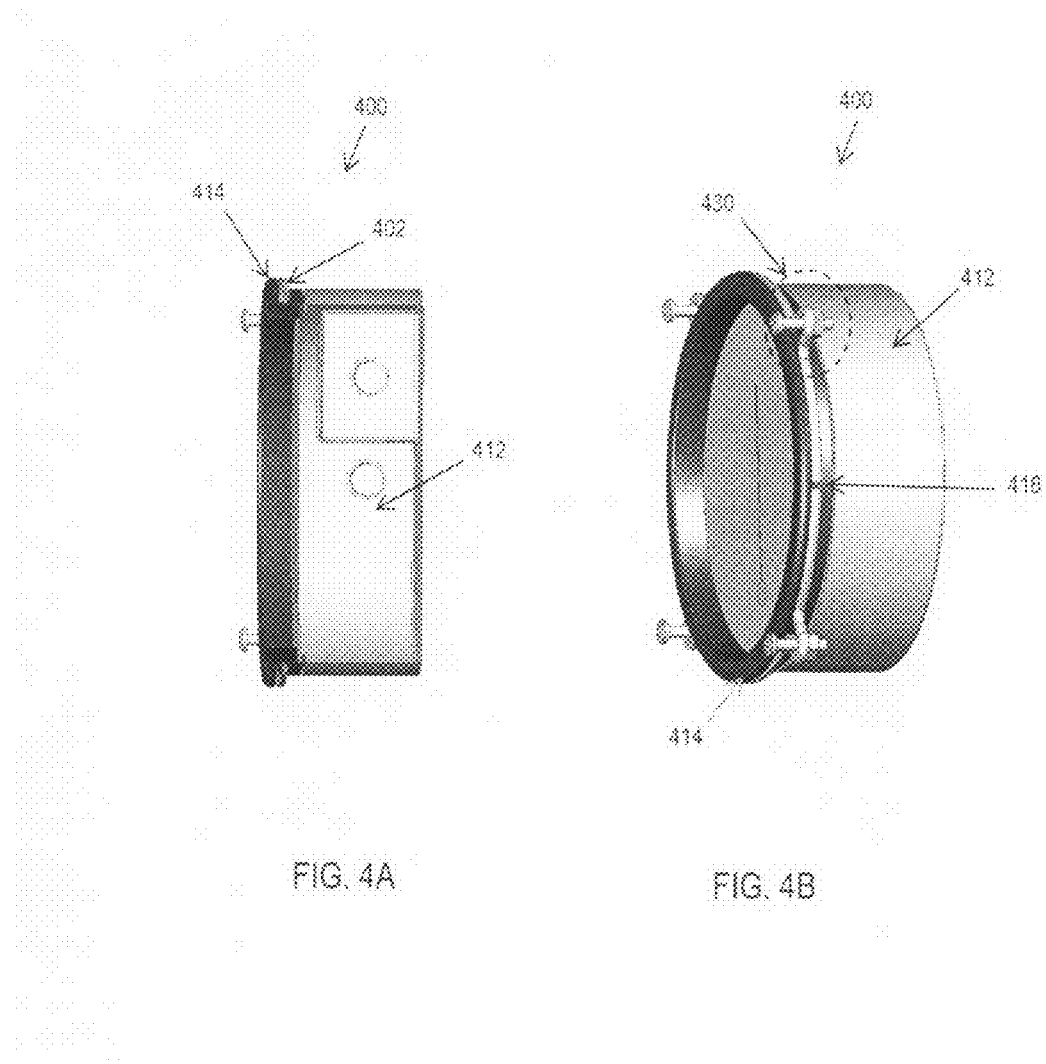
FIGS. 4A and 4B are views showing a further embodiment.

Referring to FIGS. 4A and 4B, a portion of an assembly 400 according to another embodiment is shown in a side cross sectional view, and a perspective view. Assembly portion 400 shows a gauge 412 and a fastening mechanism 402. In one particular arrangement, the embodiment of FIGS. 4A and 4B may be one variation of that shown in FIG. 2A.

In the specific embodiment of FIGS. 4A and 4B, a fastening mechanism 402 may include a mounting ring in the form of a rigid wire, or similarly, made from sheet steel, having mechanical fasteners (one shown as 430). Rigid wire fastening mechanism 402 may fit between a gauge flange 414 and a surface containing the gauge (not shown). Mechanical fasteners 430 may extend outward from a circumference of a gauge flange 414 and attach to primary i/f adapter (not shown). A rigid wire fastening mechanism 402 may include a fitting gap 418 to enable the rigid wire to be expanded to fit over gauge flange 414 and then contract into place.

While the particular embodiment of FIGS. 4A and 4B shows mechanical fasteners (e.g., 430) that include nuts bonded to a rigid wire, other embodiments may have different type mechanical fasteners disclosed in other embodiments herein, or equivalents.

In this way, an assembly may include a rigid member for insertion between a gauge flange and panel surface in which the gauge may be mounted.

Figure 5:
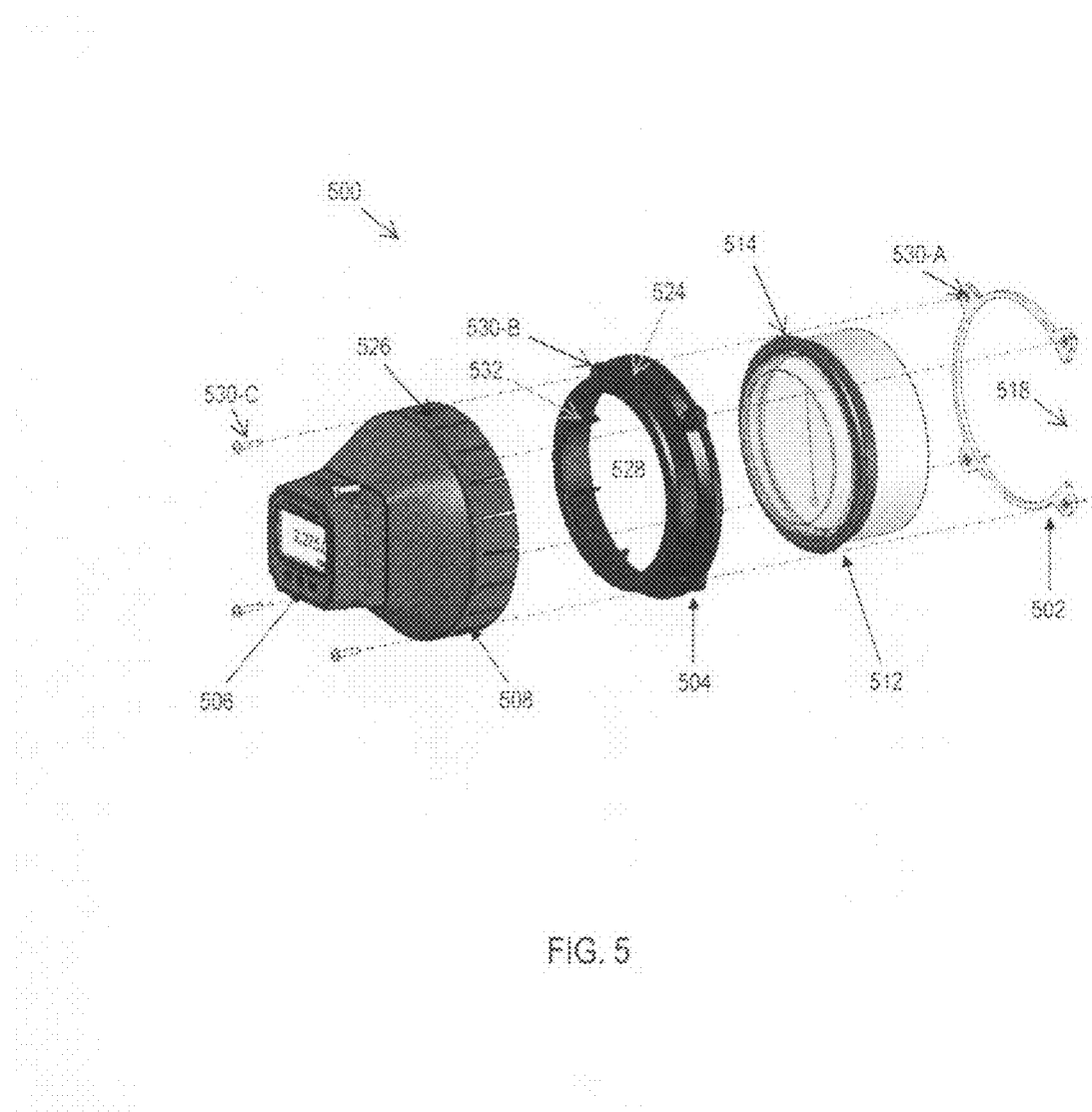
FIGS. 5 to 5B are diagrams showing various embodiments.

Referring now to FIG. 5, an assembly 500 according to another embodiment is shown in an exploded view. In one particular arrangement, the embodiment of FIG. 5 may be one variation of that shown in FIG. 2A.

In the specific embodiment of FIG. 5, an assembly 500 may include a fastening mechanism (502, 530-A to 530-C), a primary i/f adapter 504, a secondary i/f adapter 508, and a monitoring device 506. In the view shown, monitoring device 506 is attached to secondary adapter 508. FIG. 5 also shows a corresponding gauge 512.

Referring to FIG. 5, a fastening mechanism 502 may include a mounting ring in the form of a circular plate having mechanical fasteners 530-A. Circular plate fastening mechanism 502 may fit between a gauge flange 514 and a surface containing the gauge (not shown). Mechanical fasteners 530-A may be integral with and extend outward from a circumference of a gauge flange to attach to primary i/f adapter 504. In the embodiment shown, mechanical fastener 530-A may include threads for receiving a threaded body (e.g., screw, bolt). A circular plate fastening mechanism 502 may also include a fitting gap 518 between to mechanical fasteners (e.g., 530-A). A fitting gap 518 may enable an assembly to be installed without having to disconnect plumbing lines from the gauge 512. Further, for embodiments in which circular plate fastening mechanism 502 has a low profile, the circular plate fastening mechanism 502 may be installed without disconnecting gauge 512 from mounting points. That is, if a gauge flange 514 has sufficient clearance, circular plate fastening mechanism 502 may be slid between such a gauge flange 514 and a gauge surface. Alternatively, if sufficient clearance is not present, a gauge 512 connection to a panel (or other structure) may be only loosened a small amount to enable circular plate fastening mechanism 502 to be slid under the corresponding gauge flange 514.

Referring still to FIG. 5, a primary i/f adapter 504 may have an annular shape with an opening 528 through which monitoring device 506 may acquire an image of gauge 512. A primary i/f adapter 504 may include connection openings 530-B of a mechanical fastener for enabling attachment by attachment mechanism 502. Thus, in the very particular embodiment shown, a threaded body (e.g., screw or bolt) 530-C, may pass through connection openings 530-B, and thread into threads 530-A of circular plate fastening mechanism 502, to thereby mechanically attach primary i/f adapter 504 to a gauge surface.

In the embodiment shown in FIG. 5, a primary i/f adapter 504 also includes guiding members (one shown as 532). A guiding member 532 may be a rib or similar feature that establishes an orientation of primary i/f adapter 504 with respect to a gauge face, and may be used to automatically center a gauge within primary i/f adapter 504. As but one example, guiding members 532 may be formed to follow a contour of a gauge face in such a fashion so as to position the gauge with a desired orientation with respect to primary i/f adapter 504 (and hence a desired orientation with respect to a monitoring device 506 and attached secondary i/f adapter 508).

Primary i/f adapter 504 may also include a surrounding side surface 524 that extends away from a face of gauge 512 to provide a mounting surface for a secondary i/f adapter 508.

A secondary i/f adapter 508 may include an expandable/compressible edge 526 that interlocks with a surrounding side surface 524 of primary i/f adapter 504 to thereby form an easy release connection between the two adapters (504 and 508). A secondary i/f adapter 508 may fit around surrounding side surface 524 of primary i/f adapter 504, or vice versa. Such an easy release connection may be a friction fitting between the two items, or alternatively, may include additional mechanical attachment features, such as an elastic band and/or compression device (e.g., hose type clamp), as but two examples.

Figure 5A:
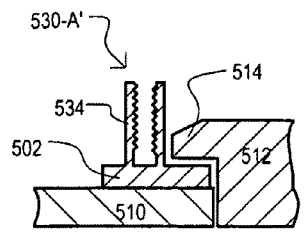
Figure 5B:
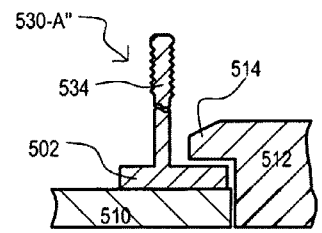

Referring now to FIGS. 5A and 5B, alternate mechanical fastener portions for a circular plate fastening mechanism, like that shown as 502 in FIG. 5, are shown in side cross sectional views. FIG. 5A shows an embodiment 530-A' in which a stud or post 534 having a threaded opening may extend away from a gauge surface 510. Bolts may then be used to attach a primary i/f adapter to such a stud/post. FIG. 5B shows an embodiment 530-A" in which a stud or post 534' having a threads may extend away from a gauge surface 510. Nuts may then be used to attach a primary i/f adapter to such a stud/post.

In this way, an assembly may include a circular plate with an opening for insertion between a gauge flange and panel surface in which the gauge may be mounted.

Figure 6:
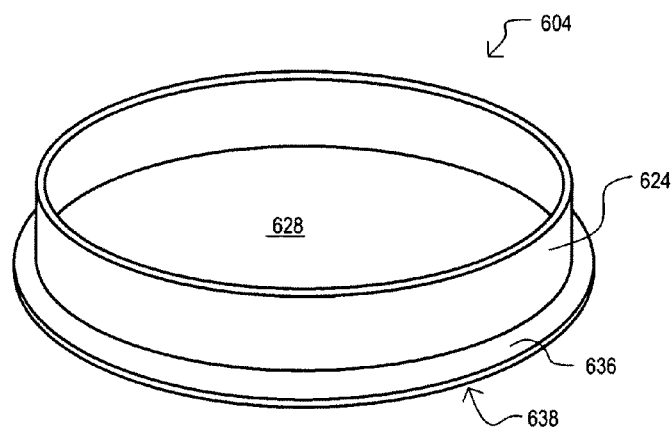
FIGS. 6 to 6B are diagrams showing a primary interface (i/f) adapter according to particular embodiments.

Referring now to FIG. 6, one embodiment of a flange-type primary i/f adapter 604 is shown in a perspective view. In one particular arrangement, the embodiment of FIG. 6 may be included in an embodiment like that shown in FIG. 2B.

A primary i/f adapter 604 may include an annular surrounding side surface 624 and an i/f collar 636. In i/f collar 636 may have a flange contact surface 638 (i.e., the bottom surface in the orientation of FIG. 6). In particular embodiments, a surrounding surface 624 may be mechanically connected to a monitoring device (not shown) or secondary i/f adapter (not shown), while an i/f collar 636 may be mechanically connected to a gauge surface (not shown).

Figure 6A:
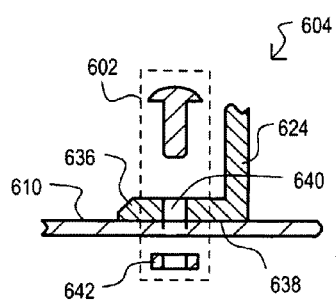

Referring to FIG. 6A, a primary i/f adapter 604 attachment is shown in a side cross sectional view. An i/f collar 636 may include a flange aperture 640. Primary i/f adapter 604 may be attached to a gauge surface 610 through flange aperture 640 with a fastening mechanism 602. As but a few examples, such a fastening mechanism may include screws, rivets, or bolts, or some combination thereof may be used. In the latter case, a nut 642 may receive a bolt on an opposite side of gauge surface 610.

Figure 6B:
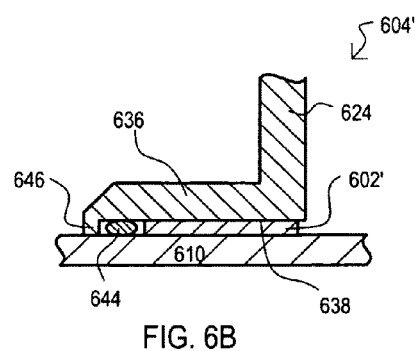

Referring to FIG. 6B, another primary i/f adapter 604' attachment is shown in a side cross sectional view. An i/f collar 636 may be attached to a gauge surface 610 by surface fastening mechanism 602'. A surface fastening mechanism 602' may affix a flange contact surface 638 to a gauge surface 610 without altering such surfaces. A surface fastening mechanism 602' may include a gel adhesive, a liquid adhesive, double sided adhesive tape, or dual surface systems, such as a hook/loop configuration (e.g., Velcro®) or interlocking surfaces (e.g., Dual-Lock™), as but a few of the many possible examples. For dual surface systems, one surface may be attached to flange contact surface 638, while the other surface may be attached to a gauge surface 610. It is understood that in this embodiment, a gauge surface 610 may be a surface of a structure in which a gauge is mounted (e.g., a panel), or may be a face of the gauge itself.

Optionally, a primary i/f adapter 604' may further include a separate sealing member 644. A separate sealing member 644 may occupy any vertical displacement created by a surface fastening mechanism 602'. This may prevent unwanted light or other externally originating items (e.g., dirt, dust, moisture) from penetrating into an inner area of the primary i/f adapter 604'. A separate sealing member 644 may be a gasket, an extruded sealing material, or an o-ring, as but a few examples.

In addition, or alternatively, a primary i/f adapter 604 may include an integral sealing member 646. An integral sealing member 646 may also occupy any vertical displacement created by a surface fastening mechanism 602' and may prevent unwanted light or items from penetrating into an inner area of the primary i/f adapter 604'. In the embodiment of FIG. 6B, an integral sealing member 646 may be a lip that extends from a flange contact surface 638.

In this way, an assembly may include a flange type primary i/f adapter that may be bonded directly to a gauge surface.

Figure 7:
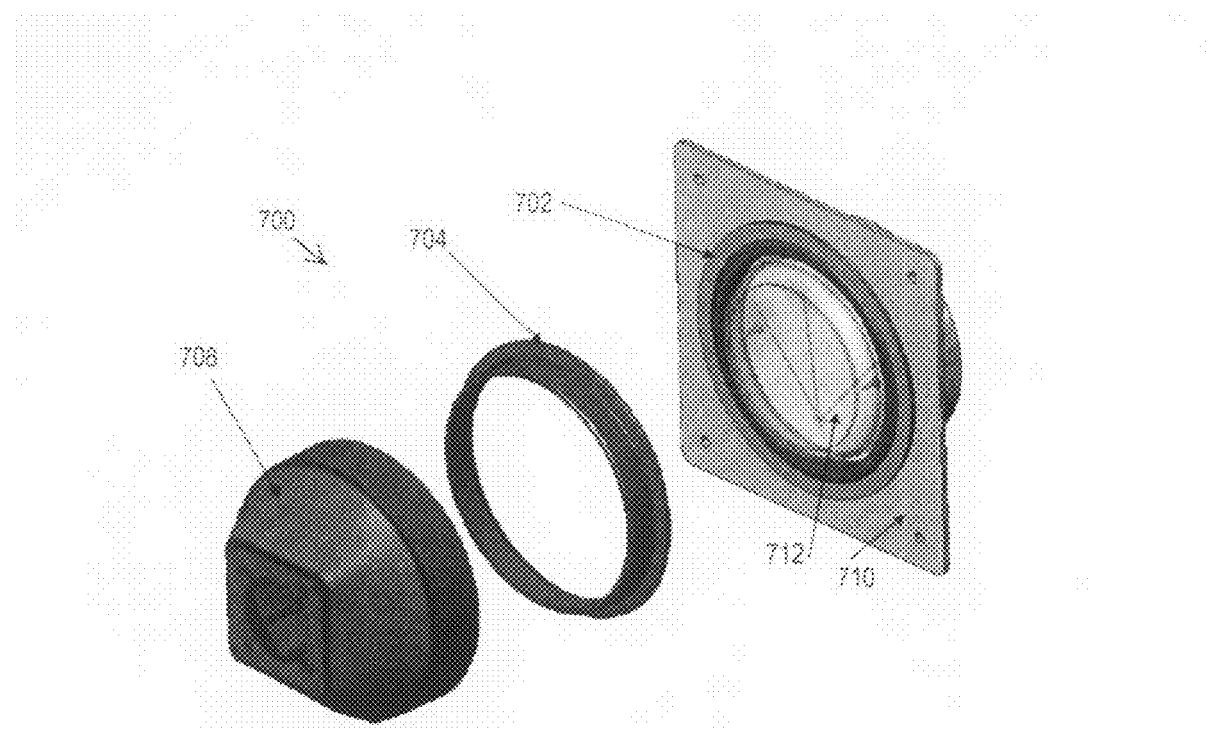
FIG. 7 is an exploded view yet another embodiment.

Referring now to FIG. 7, an assembly according to another embodiment is shown in an exploded view. In one particular arrangement, the embodiment of FIG. 7 may be one variation of that shown in FIG. 2B.

In the specific embodiment of FIG. 7, an assembly 700 may include a fastening mechanism 702, a primary i/f adapter 704, and a secondary i/f adapter 708. A fastening mechanism 702 may include any of those described in conjunction with FIG. 6B, or equivalents. Thus, a fastening mechanism 702 may include at least a portion on a gauge surface 710 around a periphery of a gauge 712 (or optionally on a face of the gauge itself). It is understood that such an arrangement may allow an assembly 700 to be attached without having to disturb a gauge (e.g., loosen it from the panel).

In this way, an assembly may be attached to a gauge surface without having to alter a gauge position.

Figure 8:
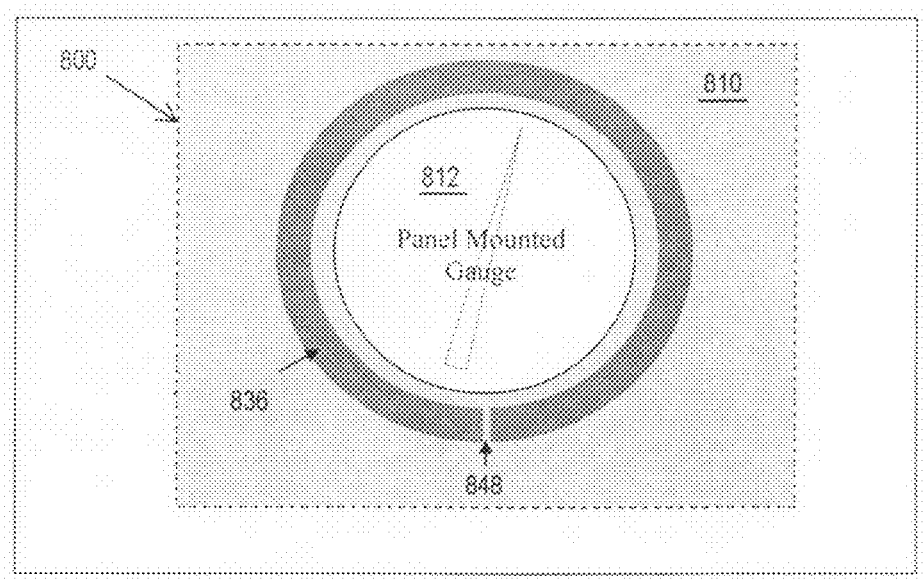
FIG. 8 is a front cross sectional view showing one embodiment.

Referring now to FIG. 8, an assembly arrangement according to another embodiment is shown in a front cross sectional view. In one particular arrangement, the embodiment of FIG. 8 may be one variation of that shown in FIG. 2B.

FIG. 8 shows an i/f collar 836 attached to a gauge surface 810. As shown, an i/f collar 836 may include a collar split 848. A collar split 848 may ease a removal process for a primary i/f adapter 804, particularly when a primary i/f adapter 804 is attached to a gauge surface 810 with a permanent or semi-permanent adhesive. A collar split 848 may enable one end of an i/f collar 836 to be peeled away with less force than an i/f collar having an unbroken contact with a gauge surface.

In this way, an assembly may include a split, or other opening in contacting surface that assists in removal of the assembly.

While the above embodiments have shown arrangements in which a primary i/f adapter may be connected to a secondary i/f adapter with various friction fittings (e.g., compressible fingers, hose clamps, elastic bands), such features should not be construed as limiting the embodiments to such approaches. A few of the many possible ways of attaching a primary i/f adapter to a secondary i/f adapter are shown in FIGS. 9A to 9E.

Figure 9A:
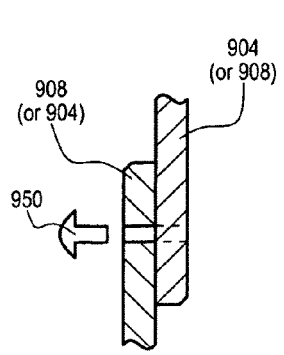
FIGS. 9A to 9E are cross sectional views showing exemplary primary-secondary i/f adapter connections according to embodiments.

FIG. 9A shows an arrangement in which a threaded object 950 may be inserted through one adapter (a secondary i/f adapter 908 or primary i/f adapter 904) against, or into, the other adapter (904 or 908). As but a few examples, a threaded object 950 may include any of a screw, set screw, or a thumbscrew. One or more such assemblies may attach the adapters (904 and 908) to one another.

Figure 9B:
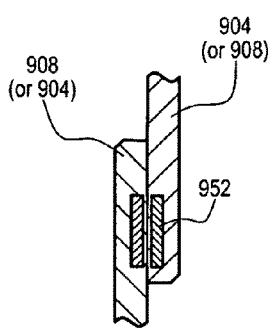

FIG. 9B shows an arrangement in which a magnet 952 may be attached to one (or both) adapters to attach the adapters to one another. One or more such assemblies may attach the adapters (904 and 908) to one another.

Figure 9C:
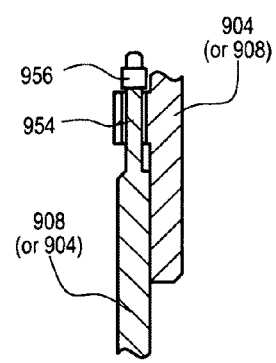

FIG. 9C shows an arrangement in which one adapter (904 or 908) includes a guidepost 954 that may be inserted into a portion of the other adapter (908 or 904). A retention feature 956 may hold the adapters in place. One or more such assemblies may attach the adapters (904 and 908) to one another.

Figure 9D:
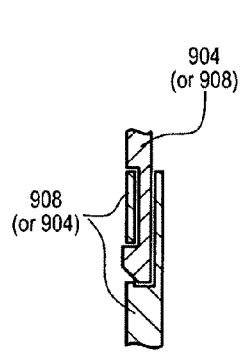

FIG. 9D shows an arrangement having a spring loaded snap-in arrangement. One or more such assemblies may attach the adapters (904 and 908) to one another.

Figure 9E:
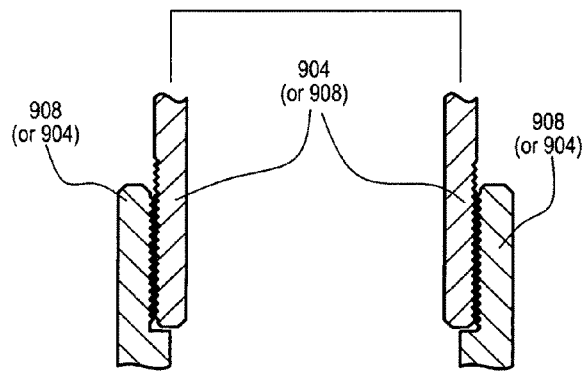

FIG. 9E shows an arrangement in which the adapters (904 and 908) include threading to enable the adapters to be screwed together.

Of course the embodiments shown in FIGS. 9A to 9D are but examples of possible connection arrangements between a primary and secondary i/f adapters.

Referring now to FIGS. 10-14 various other embodiments showing ways of attaching a primary i/f adapter to a secondary i/f adapter are shown in a series of perspective views. The embodiments shown in FIGS. 10-14 may be conceptualized as showing "quick" disconnect couplings that may enable a secondary i/f adapter (which may be attached to a monitoring device) to be quickly disconnected from a primary i/f adapter (which may be attached to a gauge surface).

Figure 10:
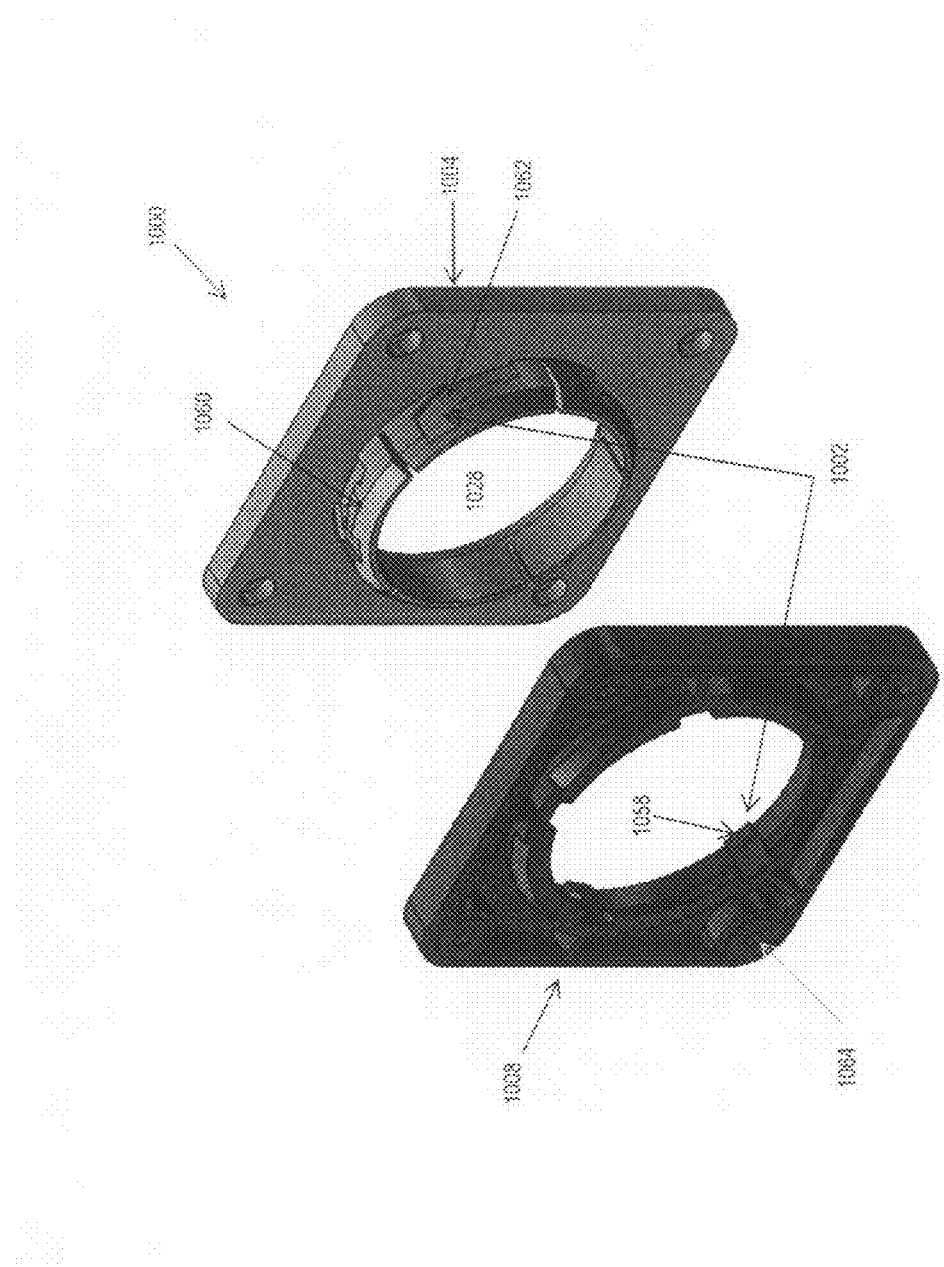
FIG. 10 is an exploded view of an assembly according to another embodiment.

FIG. 10 shows an assembly 1000 having a tab and groove arrangement. In particular, assembly 1000 may include a rotating tab and groove arrangement. One adapter (in this embodiment secondary i/f adapter 1008) may have a number of tabs (one shown as 1058), while the other adapter (in this embodiment primary i/f adapter 1004) may have spiraling grooves (one shown as 1062) for receiving such tabs. FIG. 10 shows an embodiment in which grooves may be present in conical faces (e.g., 1060). Conical faces (e.g., 1060) may provide spring force that may lock tabs in place at a terminal end of spiraling groove (e.g., 1062). Conical faces may also provide a method for very accurately centering the two pieces when they are joined, so that they may be repeatedly mated without misaligning the monitoring device in relationship to the imaged gauge face.

FIG. 10 also shows first and second i/f adapters (1004 and 1008) having plate-like structures. Such plate-like shapes may provide a low profile when an assembly 1000 is attached to a gauge face (for example, via other previously described i/f adapters). A face of secondary i/f adapter 1008 that is opposite to primary i/f adapter 1004 may include monitoring device attachment features (one shown as 1064) that may enable a monitoring device to be attached to a secondary i/f adapter 1008.

In an embodiment like that of FIG. 10, a secondary i/f adapter 1008 (and attached monitoring device) may be removed from a primary i/f adapter 1004 with a rotational movement. This may allow for easy access to a monitored gauge, as well as easy reattachment of a monitoring device while maintaining consistent alignment between the two pieces to avoid re-calibration of the imaging system.

In this way, an assembly may have a quick release between primary and secondary i/f adapters that includes a spiraling tab and groove feature. Such an embodiment may allow installation in a location with minimal clearance around a gauge being monitored.

FIG. 11 shows another assembly 1100 having a tab and groove arrangement. In particular, assembly 1100 may include a linear tab and groove arrangement. One adapter (in this embodiment primary i/f adapter 1104) may have a number of tabs (one shown as 1158), while the other adapter (in this embodiment secondary i/f adapter 1108) may have angled grooves (one shown as 1162) for receiving such tabs. FIG. 11 shows an arrangement in which such tabs and grooves are on surfaces perpendicular to a gauge face.

FIG. 11 also shows first and second i/f adapters (1104 and 1108) having plate like structures. Like the embodiment of FIG. 10, such plate-like shapes may provide a low profile when an assembly 1100 is attached to a gauge face. A secondary i/f adapter 1108 face that is opposite to primary i/f adapter 1104 may include monitoring device attachment features (one shown as 1164) that may enable a monitoring device to be attached to a secondary i/f adapter 1108.

In an embodiment like that of FIG. 11, a secondary i/f adapter 1108 (and attached monitoring device) may be removed from a primary i/f adapter 1104 with a slide and pull-away movement. This may allow for easy access to a monitored gauge, as well as easy reattachment of a monitoring device.

In this way, an assembly may have a quick release between primary and secondary i/f adapters that includes tabs and angled grooves. Such an embodiment may require minimal clearance in one direction in order to support a sliding engagement.

FIG. 12 shows another assembly 1200 having a tab and groove arrangement. In particular, assembly 1200 may include a single groove arrangement. One adapter (in this embodiment primary i/f adapter 1204) may have long tabs (one shown as 1258), while the other adapter (in this embodiment secondary i/f adapter 1208) may have a straight grooves (one shown as 1262) for receiving such tabs. FIG. 12 also shows an arrangement in which such tabs and grooves are on surfaces perpendicular to a gauge face.

Like the embodiment of FIG. 11, in FIG. 12, first and second i/f adapters (1204 and 1208) may be plate like structures, for a low profile assembly when attached to a gauge face. A secondary i/f adapter 1208 face that is opposite to primary i/f adapter 1204 may include monitoring device attachment features (one shown as 1264) that may enable a monitoring device to be attached to a secondary i/f adapter 1208.

In an embodiment like that of FIG. 12, a secondary i/f adapter 1208 (and attached monitoring device) may be removed from a primary i/f adapter 1204 with a single sliding movement. This may allow for easy access to a monitored gauge, as well as easy reattachment of a monitoring device.

In this way, an assembly may have a quick release between primary and secondary i/f adapters that includes tabs and straight grooves.

FIG. 13 shows an assembly 1300 having a further tab and groove arrangement. In particular, assembly 1300 may include a flat rotating tab and groove arrangement. One adapter (in this embodiment secondary i/f adapter 1308) may have a number of tabs (one shown as 1358), while the other adapter (in this embodiment primary i/f adapter 1304) may have grooves (one shown as 1362) for receiving such tabs.

Like the embodiment of FIGS. 11 and 12, in FIG. 13, first and second i/f adapters (1304 and 1308) may be low-profile plate like structures. A secondary i/f adapter 1308 face that is opposite to primary i/f adapter 1304 may include monitoring device attachment features (one shown as 1364) that may enable a monitoring device to be attached to a secondary i/f adapter 1308.

The embodiment of FIG. 13 may also include a gasket 1366 between primary and secondary i/f adapters (1304 and 1308). A gasket 1366 may provide a seal between the two adapters, and in addition, may act as a spring and/or provide a greater friction for tabs (e.g., 1358) within corresponding grooves (e.g. 1362).

In an embodiment like that of FIG. 13, a secondary i/f adapter 1308 (and attached monitoring device) may be removed from a primary i/f adapter 1304 with a rotation and pull movement. This may allow for easy access to a monitored gauge, as well as easy reattachment of a monitoring device.

In this way, an assembly may have a quick release between primary and secondary i/f adapters that includes a horizontal rotating tab and groove feature.

FIG. 14 shows an assembly 1400 having a hinged arrangement. Primary and secondary i/f adapters (1404 and 1408) may be joined by a removable hinge structure 1468. Like the embodiment of FIG. 13, in FIG. 14 first and second i/f adapters (1404 and 1408) may be low-profile plate like structures having an interface gasket 1466 disposed in between.

In an embodiment like that of FIG. 14, a secondary i/f adapter 1408 (and attached monitoring device) may be moved by rotating secondary i/f adapter 1408 on hinge structure 1468. Such movement may enable a gauge to be examined without disturbing orientation of the assembly components with respect to one another. After a gauge inspection, a secondary i/f adapter 1408 may be easily swung back into a closed position. Further, a secondary i/f adapter 1408 may be entirely freed from an assembly in the particular open hinged structure shown, if desired. This may allow for easy access to a monitored gauge, as well as easy reattachment of a monitoring device.

Referring still to FIG. 14, an assembly 1400 may also include a locking structure 1470. A locking structure 1470 may enable first and second i/f adapters (1404 and 1408) to be locked in a closed position. In the particular embodiment shown, adapters (1404 and 1408) may have aligning holes through which an object may be inserted. Of course, various other locking mechanisms may be included in this, or any of the other embodiments.

In this way, an assembly may have a quick release between primary and secondary i/f adapters that includes a hinge structure.

While the above embodiments have shown arrangements in which an assembly may be attached to monitor a gauge installed into a panel, or other flat surface, other embodiments may have arrangements in which an assembly may be attached to a free standing gauge, such as a "process" gauge. Such embodiments will now be described with reference to FIGS. 15A to 16.

Figure 15A:
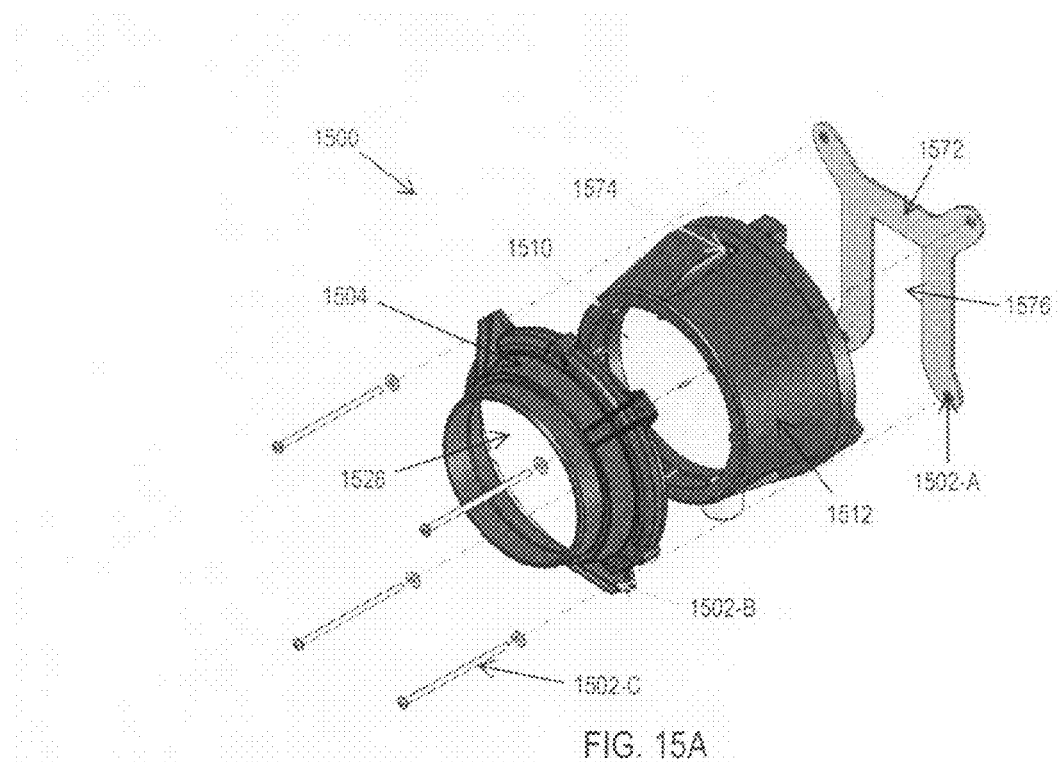
FIGS. 15A-15C are various views of an assembly, and assembly components according to multiple embodiments.

Referring to FIG. 15A, an assembly 1500 according to one embodiment is shown in an exploded view. In one particular arrangement, the embodiment of FIG. 15A may be one variation of that shown in FIG. 2C.

An assembly 1500 may include a fastening mechanism 1502-A/B/C, and a primary i/f adapter 1504, and may attach to a gauge 1512 that is not installed in a panel, or the like. A primary i/f adapter 1502 may be a capture ring structure having a generally annular shape, and may include one or more internal surfaces for contacting a gauge surface (in this embodiment the gauge surface may be the gauge face).

A fastening mechanism 1502-A/B/C may take various forms. In the particular embodiment of FIG. 15A, a fastening mechanism may include a connection plate 1572 having receiving holes 1502-A, adapter receiving holes 1502-B within primary i/f adapter 1504, and insertion members (one shown as 1502-C). As but one example, insertion members (e.g., 1502-C) may be screws, bolts, or rivets that extend through receiving holes 1502-A/B and thereby attach primary i/f adapter 1504 to a gauge 1512. A connection plate 1572 may include a plate opening 1576 to enable a connection plate 1572 to clear features that might extend from a back surface of gauge 1512. For example, a connection plate 1572 may be rotated from the orientation of FIG. 15A, as necessary to avoid features extending from a back surface of gauge 1512.

It is also noted that a connection plate 1572 may be inserted between a gauge flange and a corresponding panel surface in other embodiments.

Referring still to FIG. 15A, in one alternate embodiment, a fastening mechanism 1502 may not include connection plate 1572. In such an embodiment, with insertion members (e.g., 1502-C) may extend through gauge aligned holes (one shown as 1580) of primary i/f adapter 1504 and into gauge attachments 1574 of a gauge 1512 itself.

The various fastening mechanisms discussed above in conjunction with FIG. 15A may enable an assembly to be attached to a gauge, even though the gauge has a sloped surface with respect the gauge face.

Figure 15B:
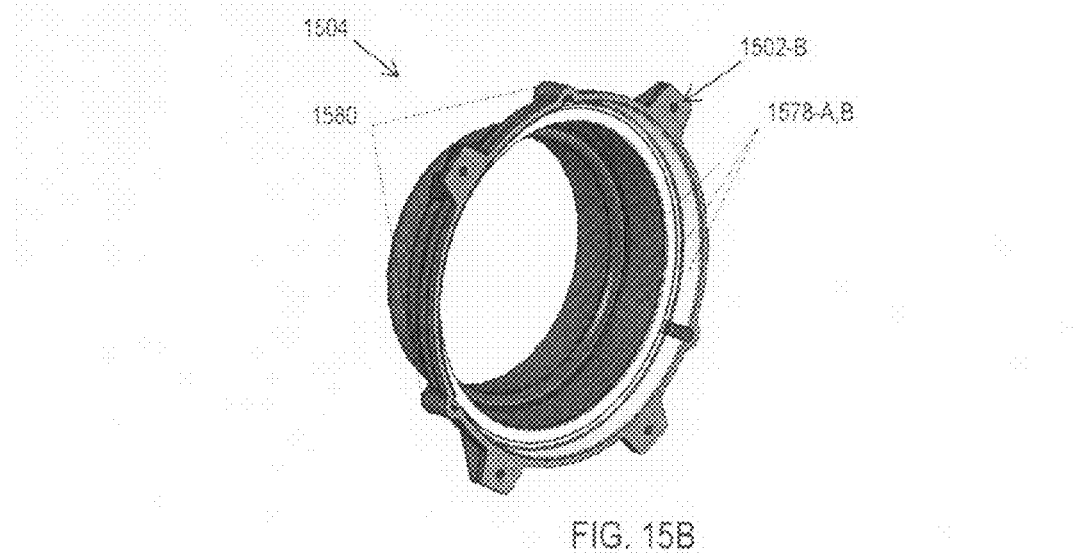

FIG. 15B shows a view of an inside region of a primary i/f adapter 1504. In the particular embodiment shown, a primary i/f adapter 1504 may include various different internal surfaces (1578-A,B) to accommodate different diameter gauge sizes. The view of FIG. 15B shows receiving holes (one shown as 1502-B) for providing a connection to a connection plate, as well as gauge aligned holes (two shown as 1580) for providing a direct connection to a gauge. In a very particular embodiments, gauge aligned holes (e.g., 1580) may be situated at predetermined positions around a circumference of primary i/f adapter 1504 that correspond to known gauge designs (e.g., spaced 120° apart).

Figure 15C:
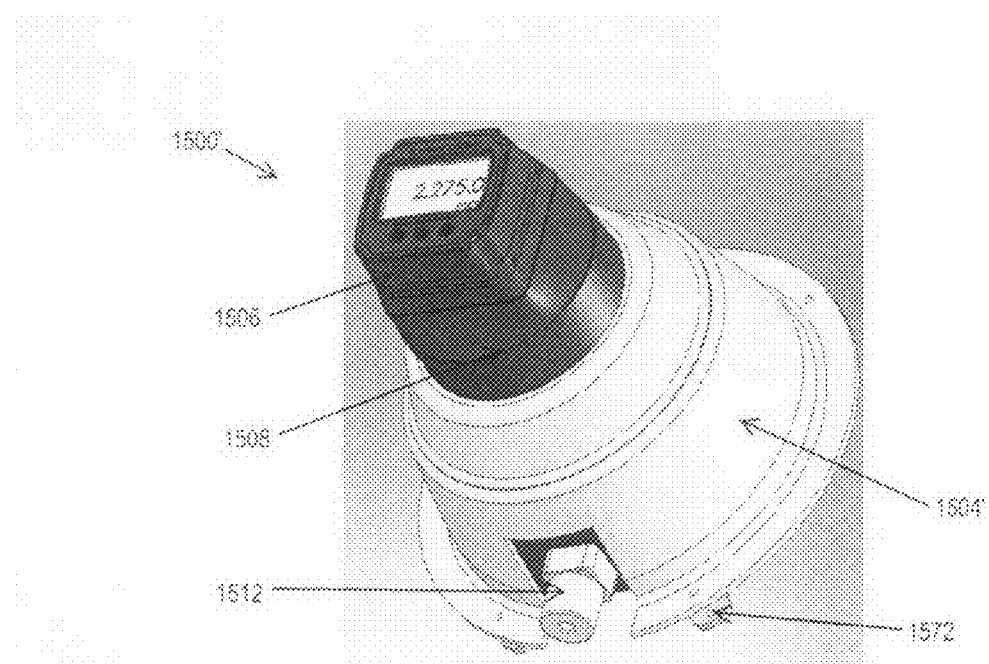

Referring to FIG. 15C, another assembly 1500' embodiment is shown. In one particular arrangement, the embodiment of FIG. 15C may be one variation of that shown in FIG. 2C.

Assembly 1500' may include many of the features of that shown in FIG. 15A. However, FIG. 15C shows a monitoring device 1506 attached to a secondary i/f adapter 1508. Further, a primary i/f adapter 1504' may be a surrounding cap that may protect a monitored gauge 1512 from unwanted water entry, dust entry, insect entry. Such a feature may also improve reflected light conditions for acquiring an image of a monitored gauge 1512.

In this way, assemblies may be connected to gauges not installed in panels that have sloped surfaces with respect to a gauge face.

Figure 16:
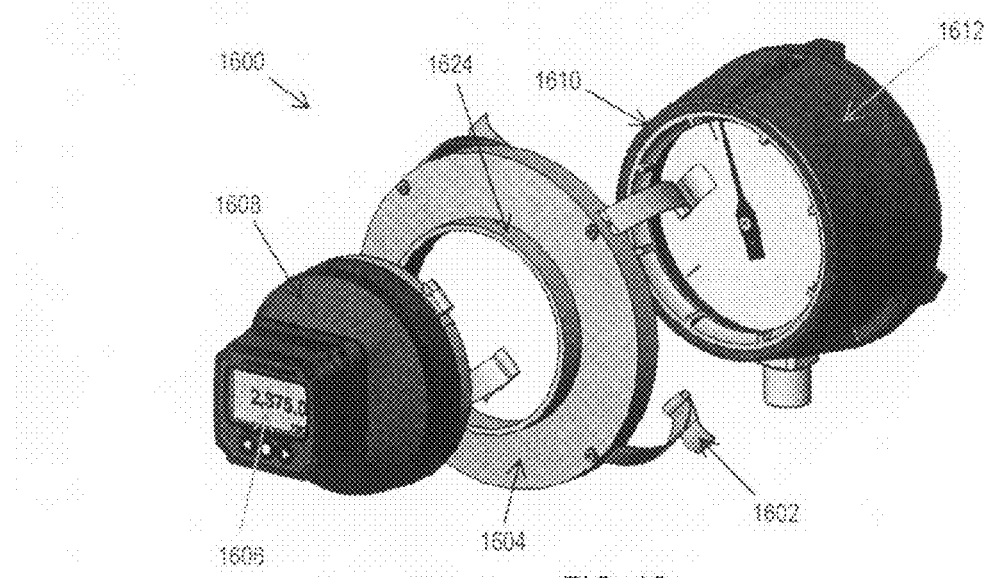
FIG. 16 is an exploded view of still a further embodiment.

Referring to FIG. 16, an assembly 1600 according to a further embodiment is shown in an exploded view. An assembly 1600 may include a fastening mechanism (a portion of which is shown as 1602), and a primary i/f adapter 1604, a secondary i/f adapter 1608, and a monitoring device 1606.

A primary i/f adapter 1604 may be a capture ring structure like that shown in FIGS. 15A and 15B, or an equivalent structure.

A fastening mechanism may be a collection of spring clips (one shown as 1602) attached to outer edges of primary i/f adapter 1604. Such spring clips (e.g., 1602) may wrap around side surfaces of a gauge 1612 and grip a back surface of a gauge 1612 to thereby force an inner surface of primary i/f adapter 1602 to contact a gauge surface 1610 (which in this embodiment may be a gauge face).

Such fastening mechanisms may also enable an assembly to be attached to a gauge, even though the gauge has a sloped surface with respect the gauge face.

In the particular embodiment of FIG. 16, a secondary i/f adapter 1608 may attach to a primary i/f adapter 1604 with a hose clamp, as but one example.

In this way, an assembly may include an attachment mechanism that forces a primary i/f adapter to contact a gauge surface by a connection to a back surface of a gauge or to the gauge itself.

It is noted that while the embodiments have shown primary i/f adapters for use with circular gauges, alternate embodiments may have different shapes corresponding to the shape of the gauge being monitored. That is, primary i/f adapters need not have annular shapes, but may be rectangular, etc.

It is also noted that while embodiments herein have described assemblies in conjunction with "gauges" and "gauge surfaces", such embodiments should not be construed and unnecessarily being limited to any particular type of monitored equipment. That is, embodiments may be used in conjunction with monitored equipment having dials, meters, or similar features.

It should be appreciated that in the foregoing description of exemplary embodiments, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, inventive aspects lie in less than all features of a single foregoing disclosed embodiment. Thus, the claims following the detailed description are hereby expressly incorporated into this detailed description, with each claim standing on its own as a separate embodiment of this invention.

It is also understood that the embodiments of the invention may be practiced in the absence of an element and/or step not specifically disclosed. That is, an inventive feature may be the elimination of an element.

Accordingly, while the various aspects of the particular embodiments set forth herein have been described in detail, the present invention could be subject to various changes, substitutions, and alterations without departing from the spirit and scope of the invention.

What is claimed is:

1. A gauge monitoring assembly, comprising:
an adapter that mechanically positions a monitoring device to acquire a gauge image and then convert the gauge image into a digital value, the adapter comprising
a fastening mechanism having at least a first fastening portion attachable to a gauge surface, and
an interface (i/f) that is physically attached to the fastening mechanism, the i/f including at least a primary i/f adapter with a detachable connection to the monitoring device that enables the monitoring device to be removed while the fastening portion remains attached to the gauge surface.

2. The gauge monitoring assembly of claim 1, wherein:
the fastening mechanism includes an attaching portion insertable between a gauge flange and a surface containing the gauge.

3. The gauge monitoring assembly of claim 2, wherein:
the attaching portion includes a plurality of capture fingers; and
the primary i/f adapter includes a surrounding member for wrapping around the flange that is rigidly connected to the capture fingers.

4. The gauge monitoring assembly of claim 1, wherein:
the i/f includes
the primary i/f adapter comprising a primary plate having a first opening therein, a first primary surface attachable to a gauge surface and an opposing second primary surface;
a second i/f adapter comprising a second plate having a second opening therein, a first secondary surface and a second secondary surface attachable to the monitoring device; wherein
the primary plate and secondary plate have a quick disconnect coupling that enables the second plate to be moved to expose the first opening.

5. The gauge monitoring assembly of claim 4, wherein:
the quick disconnect coupling includes
one of the primary or secondary plates having capture grooves formed therein, and
the other of the primary or secondary plates having tabs for insertion into the capture grooves.

6. The gauge monitoring assembly of claim 5, wherein:
the tabs are insertable into the capture grooves with a movement selected from: a rotational movement, and at least one linear movement.

7. The gauge monitoring assembly of claim 1, wherein:
the primary i/f adapter includes an adapter ring having at least one contacting surface internal to the ring for contacting a gauge face and maintaining visibility of the gauge face through an opening in the adapter ring, and
the fastening mechanism includes an adapter ring mechanical connection for attaching the adapter ring to the gauge.

8. The gauge monitoring assembly of claim 1, wherein:
the adapter comprises an enclosure that surrounds the gauge apart from an opening, and
the primary i/f adapter detachable interface that provides the detachable connection to the monitoring device at the opening.

9. A gauge monitoring assembly, comprising:
an adapter, comprising
a fastening mechanism having at least a first fastening portion attachable to a gauge surface,
an interface (i/f) that is physically attached to the fastening mechanism, the i/f including
a primary i/f adapter attachable to a monitored gauge by the fastening mechanism that includes an opening through which an image of the monitored gauge may be acquired, and
a secondary i/f adapter having a device interface for connecting to a monitoring device for acquiring an image through the opening and that forms an i/f coupling with the primary i/f adapter that enables the secondary i/f adapter to be moved with respect to the primary i/f adapter to expose the opening.

10. The gauge monitoring assembly of claim 9, wherein:
the fastening mechanism is selected from the group consisting of: an adhesive, double sided tape, magnet; and
the primary i/f adapter includes a flat surface for receiving the fastening mechanism and contacting the gauge surface.

11. The gauge monitoring assembly of claim 9, wherein:
the fastening mechanism includes a first of a two part fastening mechanism fixed to the gauge face,
a second of the two part fastening mechanism is fixed to the primary i/f adapter.

12. The gauge monitoring system of claim 9, wherein:
the i/f includes
the primary i/f adapter having a primary attachment portion with a surrounding i/f collar, the i/f collar having a flat surface for contacting and attaching to the gauge surface, and
a second i/f adapter having a second attachment portion; wherein
the first and second attachment portions fit within each other and are attached to one another by a removable i/f connection.

13. The gauge monitoring assembly of claim 12, wherein:
the primary i/f further includes a lip extending from the i/f collar in an opposite direction from the primary attachment portion.

14. The gauge monitoring assembly of claim 12, wherein:
a gasket insertable between the i/f collar and the gauge surface.

15. A method of monitoring a gauge, comprising:
attaching a primary interface (i/f) adapter to a gauge face, the primary i/f adapter having a primary opening therein for exposing the gauge face and an attachment portion extending away from the gauge face; and
mechanically coupling a monitoring device to the primary i/f adapter with a removable mechanical coupling to enable the monitoring device to capture an image through the primary opening, the removable mechanical coupling enabling the monitoring device to be repositioned to expose the gauge face.

16. The method of claim 15, wherein:
attaching the primary i/f adapter to a gauge face includes positioning a fastening portion of the primary i/f between a flange of a gauge and an opposing gauge surface so that an attachment portion of the primary i/f extends away from the gauge surface.

17. The method of claim 15, wherein:
attaching the primary i/f adapter to a gauge face includes affixing the primary i/f adapter to an attaching surface that surrounds, and is generally parallel to, the gauge face so that an attachment portion of the primary i/f extends away from the gauge face.

18. The method of claim 15, wherein:
mechanically coupling the monitoring device to the primary i/f adapter includes
attaching a secondary i/f to the attachment portion of the primary i/f adapter, the secondary i/f adapter having a secondary opening therein for exposing the gauge face and device attachment portion; and the monitoring device is mechanically attached to the secondary i/f to capture the image through the primary and secondary openings.

19. The method of claim 15, wherein:

attaching the primary i/f adapter to the gauge face includes placing an adapter ring having at least one contacting surface internal to the ring in contact with the gauge face while maintaining visibility of the gauge face through an opening in the adapter ring, and mechanically fastening the adapter ring to the gauge with a force that presses the adapter ring to the gauge face.

20. The method of claim 19, wherein:

the force is generated from any of: threaded connections between the adapter ring and the gauge, threaded connections between the adapter ring and an attachment plate on a surface of the gauge opposite to the gauge face, and spring clips.

* * * * *